United States Patent [19]
Cart

[11] Patent Number: 6,047,987
[45] Date of Patent: Apr. 11, 2000

[54] STEERING ARRANGEMENT FOR A MOTOR VEHICLE

[75] Inventor: Danny J. Cart, Long Beach, Calif.

[73] Assignee: Chrysler Corporation, Auburn Hills, Mich.

[21] Appl. No.: 08/915,198

[22] Filed: Aug. 20, 1997

Related U.S. Application Data

[60] Provisional application No. 60/035,759, Jan. 6, 1997.

[51] Int. Cl.⁷ .............................. B62D 1/18; B62D 25/14
[52] U.S. Cl. ............................ 280/775; 280/779; 74/493
[58] Field of Search .................... 280/775, 779; 180/90; 296/70; 74/493

[56] References Cited

U.S. PATENT DOCUMENTS

| | | | |
|---|---|---|---|
| 3,424,473 | 1/1969 | Morgan | 280/775 |
| 3,518,895 | 7/1970 | Buechler | 74/493 |
| 3,803,939 | 4/1974 | Schenten | 74/493 |
| 4,078,448 | 3/1978 | Naka | 74/493 |
| 4,719,986 | 1/1988 | Richardson | 180/287 |
| 5,067,747 | 11/1991 | Yokoyama | 280/777 |
| 5,265,492 | 11/1993 | Snell | 74/493 |
| 5,301,567 | 4/1994 | Snell et al. | 74/493 |
| 5,339,706 | 8/1994 | Freeman | 74/493 |
| 5,452,624 | 9/1995 | Thomas et al. | 74/493 |
| 5,566,585 | 10/1996 | Snell et al. | 74/493 |

*Primary Examiner*—J. J. Swann
*Assistant Examiner*—Andrew J. Ririe
*Attorney, Agent, or Firm*—Mark P. Calcaterra

[57] ABSTRACT

A steering arrangement for a motor vehicle having an instrument panel including a steering column with a first end extending into the passenger compartment of the motor vehicle. The steering column includes a tilt mechanism for pivotally interconnecting the steering column with a steering wheel. The steering arrangement includes a shroud having a first member and a second member, the first member is fixedly attached to the instrument panel of the vehicle and the second member is interconnected with the steering wheel for movement therewith. In a preferred form, the first and second members partially overlap when the steering wheel is in the raised position.

6 Claims, 3 Drawing Sheets

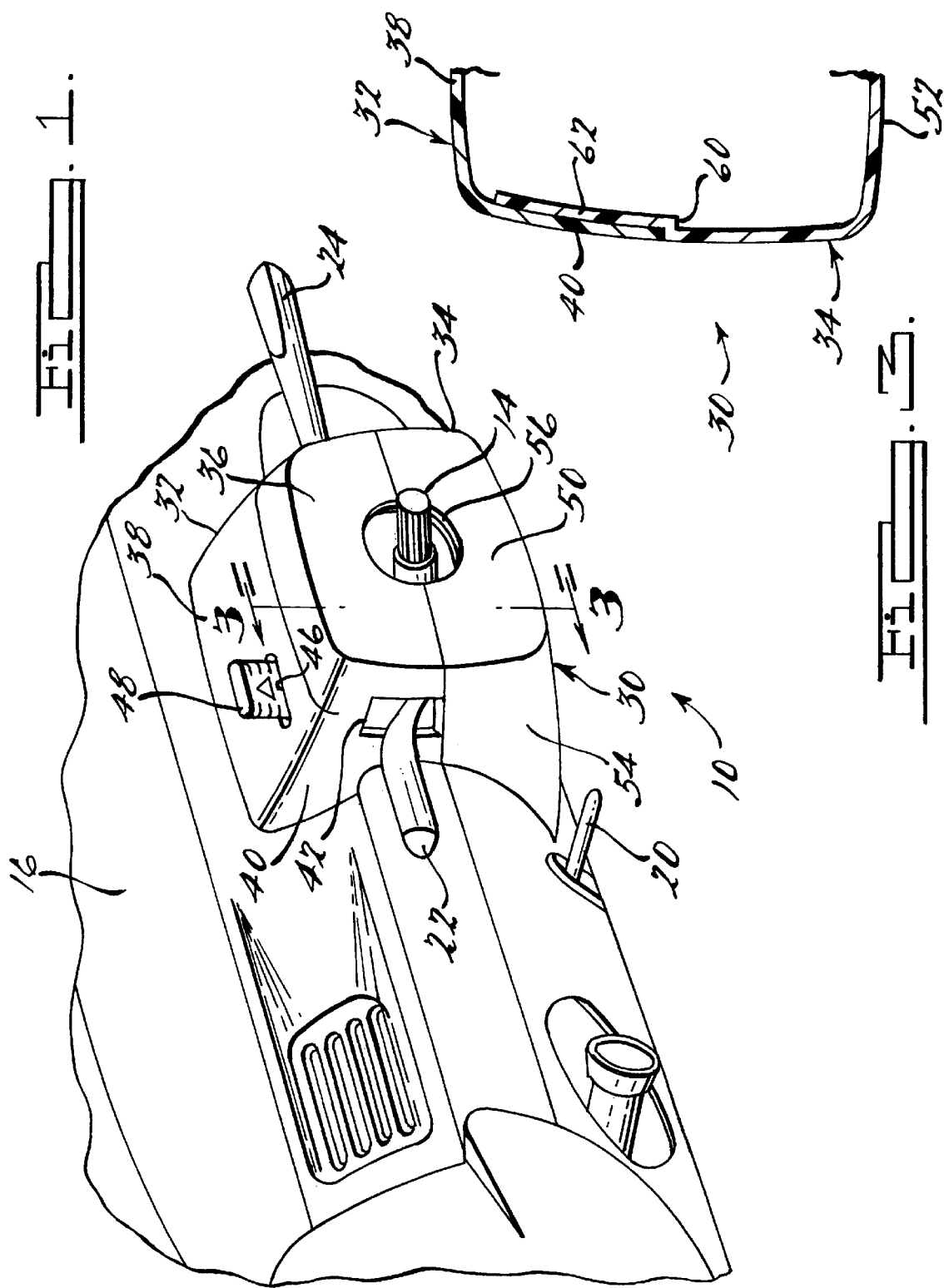

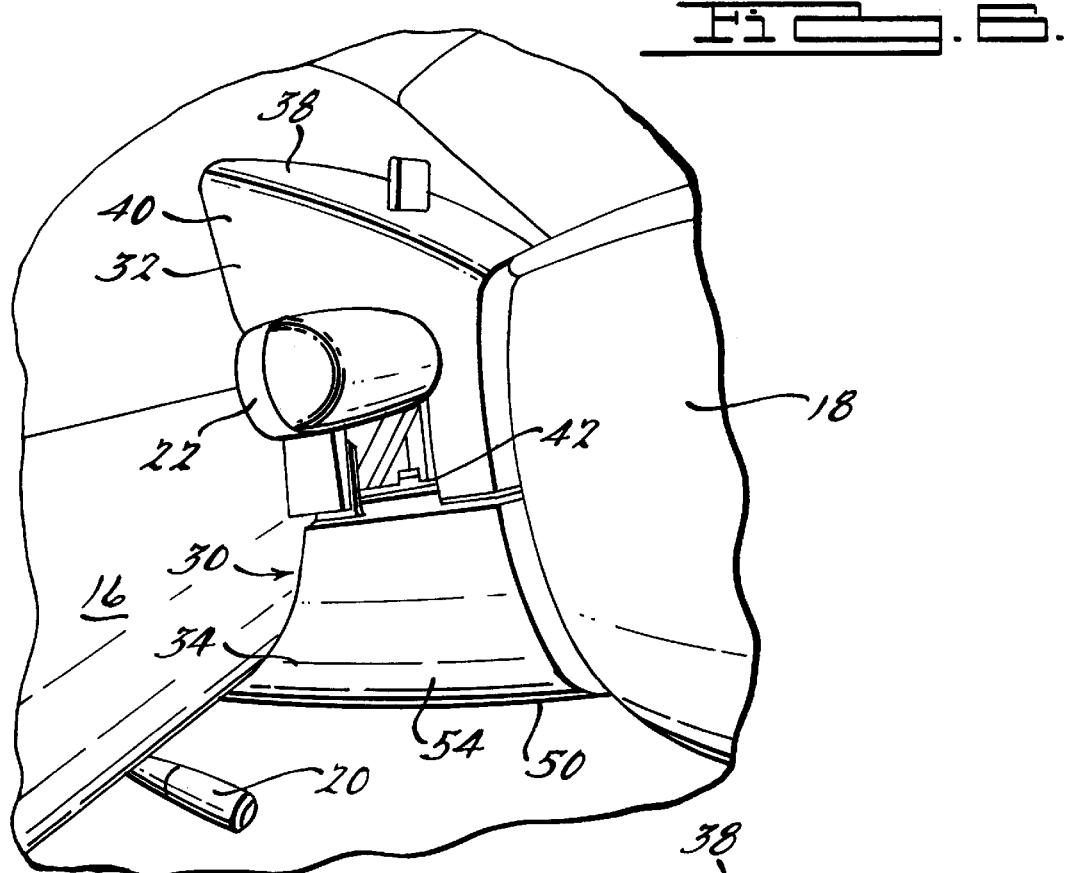
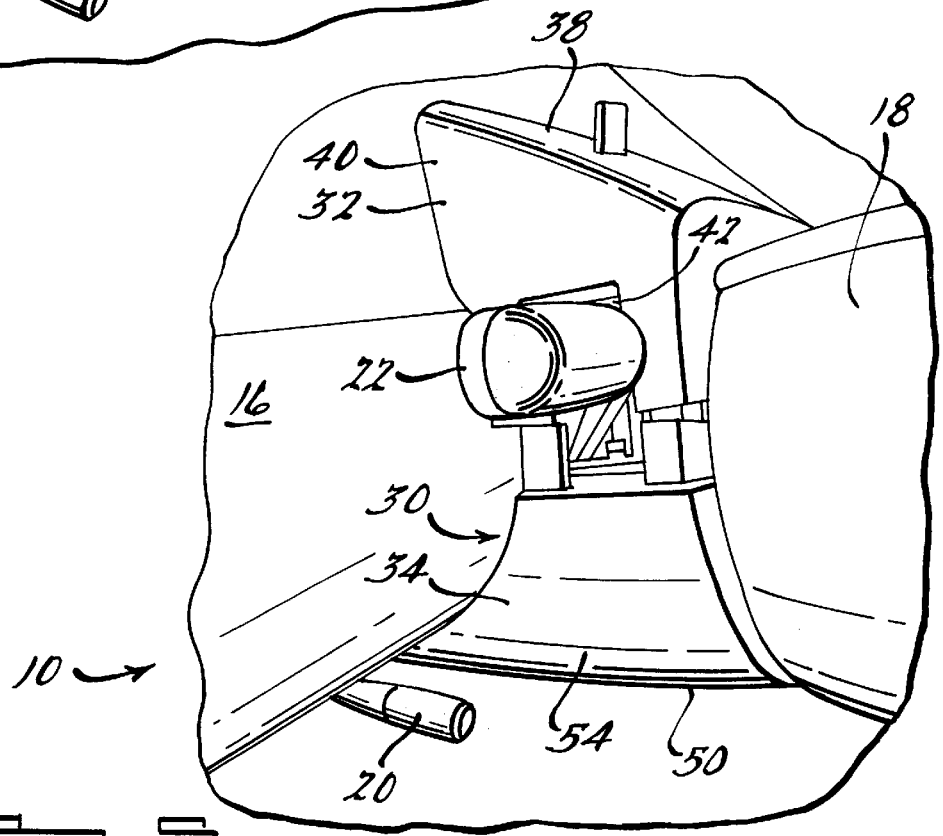

STEERING ARRANGEMENT FOR A MOTOR VEHICLE

CROSS-REFERENCE TO RELATED APPLICATION

This application is a conventional application based on a provisional application filed Jan. 6, 1997 and assigned U.S. Ser. No. 60/035,759.

BACKGROUND OF THE INVENTION

1. Field of the Invention

The present invention relates, in general, to a steering arrangement for a motor vehicle. More particularly, the present invention relates to a steering arrangement for a motor vehicle including a tilt steering wheel and a shroud having a first member fixedly positioned with respect to the instrument panel and a second member interconnected to the tilt steering wheel for movement therewith.

2. Discussion

In a conventional manner, motor vehicles are provided with steering systems including a steering column which upwardly extends into the passenger compartment where it is interconnected with a steering wheel. To accommodate varying physical attributes and driver comfort preferences, the steering systems of modern vehicles are also equipped with a mechanism which permits the steering wheel to be adjusted upwardly or downwardly. Such a feature, which is commonly referred to as "tilt steering", also facilitates driver entry into and exit from the vehicle. A typical type of tilt mechanism is incorporated into the steering column adjacent the steering wheel. One suitable tilt mechanism for a steering wheel is shown and described in commonly owned U.S. Pat. No. 5,339,706 entitled "Latchable Steering Column Tilt Mechanism". U.S. Pat. No. 5,339,706 is hereby incorporated by reference as if fully set forth herein.

Various approaches, including that shown and described in U.S. Pat. No. 5,339,706, have been suggested in the prior art for providing motor vehicles with a tilt steering wheel feature. Many of these known arrangements have proven to be effective for adjusting the steering wheel vertically relative to the driver and have been commercially successful. However, all known arrangements are associated with disadvantages. Most significantly insofar as the present invention is concerned, known arrangements for facilitating vertical adjustment of a steering wheel expose the steering column or otherwise provide an undesirable visual impression when the steering wheel is downwardly pivoted to its lowered position. Consumer purchasing decisions and owner satisfaction are significantly affected by vehicle styling, including interior styling. As with the vehicle exterior, interior vehicle designs often desire an uninterrupted visual impression. Heretofore, the steering arrangements for motor vehicles have frequently been unable to attain such a visual impression with a tilt steering application.

Accordingly, it is desired to provide a steering arrangement for a motor vehicle which permits the steering wheel to be vertically adjusted without exposing the steering column.

SUMMARY OF THE INVENTION

It is a principal object of the present invention to provide a steering arrangement for a motor vehicle including a tilt steering feature which is operative for effectively concealing the steering column from the view of the vehicle occupants as the steering wheel is adjusted between vertical positions.

It is a related object of the present invention to provide a steering arrangement for a motor vehicle which provides an integrated visual impression with the instrument panel of the motor vehicle.

It is a more particular object of the present invention to provide a steering arrangement for a motor vehicle including a tilt steering wheel and a shroud having cooperating components which conceal the steering column as the steering wheel is adjusted between vertical positions.

In one form, the present invention provides a shroud for a motor vehicle steering arrangement having a steering wheel interconnected to a steering column through a tilt mechanism. The shroud comprises a first member and a second member. The first member is fixedly interconnected to the steering column. The second member is interconnected to the steering wheel for pivotal movement therewith as the steering wheel is moved between a raised position and a lower position. The first and second members are at least partially overlapped when the steering wheel is in the raised position.

In another form, the present invention provides a steering arrangement for a motor vehicle having an instrument panel. The steering arrangement includes a steering wheel and a steering column having a tilt mechanism for pivotally interconnecting the steering wheel such that the steering wheel is moveable relative to the steering column between a raised position and a lowered position. The steering arrangement further includes a shroud having a first member and a second member. The first member is fixedly interconnected to the instrument panel of the vehicle. The second member being interconnected with the steering wheel for movement therewith. In a preferred embodiment, one of the first and second members overlap when the steering wheel is in the raised position.

BRIEF DESCRIPTION OF THE DRAWINGS

Additional objects and advantages of the present invention will become apparent from a reading of the following detailed description of the preferred embodiment which makes reference to the drawings of which:

FIG. 1 is an environmental view of a steering arrangement constructed according to the present invention shown operatively associated with an instrument panel of a motor vehicle, the steering arrangement includes a steering wheel which has been removed for purposes of illustration;

FIG. 2 is side view of the steering arrangement and instrument panel of FIG. 1 shown with the steering wheel mounted to an end of the steering column;

FIG. 5 is an enlarged front and side perspective view of a portion of the steering arrangement and instrument panel of FIG. 1, illustrating the steering wheel vertically adjusted to its lowered position; and FIG. 6 is a view similar to FIG. 4, illustrating the steering wheel adjusted to its raised position.

DETAILED DESCRIPTION OF THE PREFERRED EMBODIMENT

Figure 3:
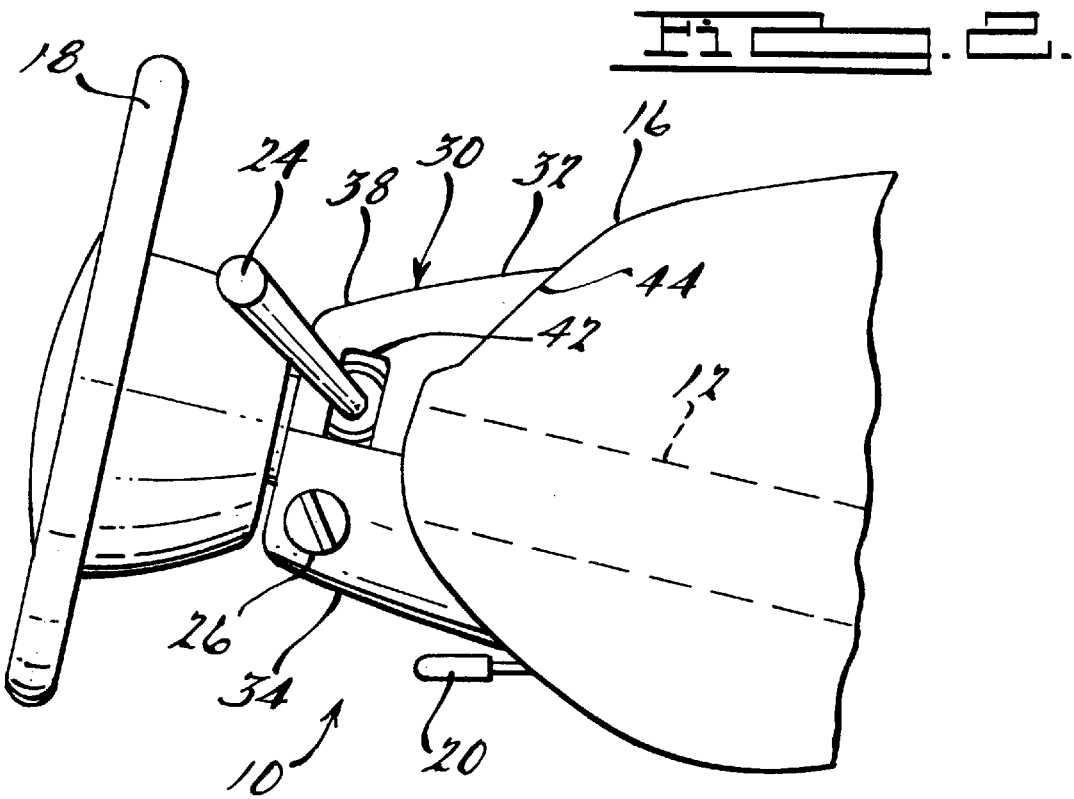
FIG. 3 is cross-sectional view of a portion of a shroud of the steering arrangement.
Figure 4:
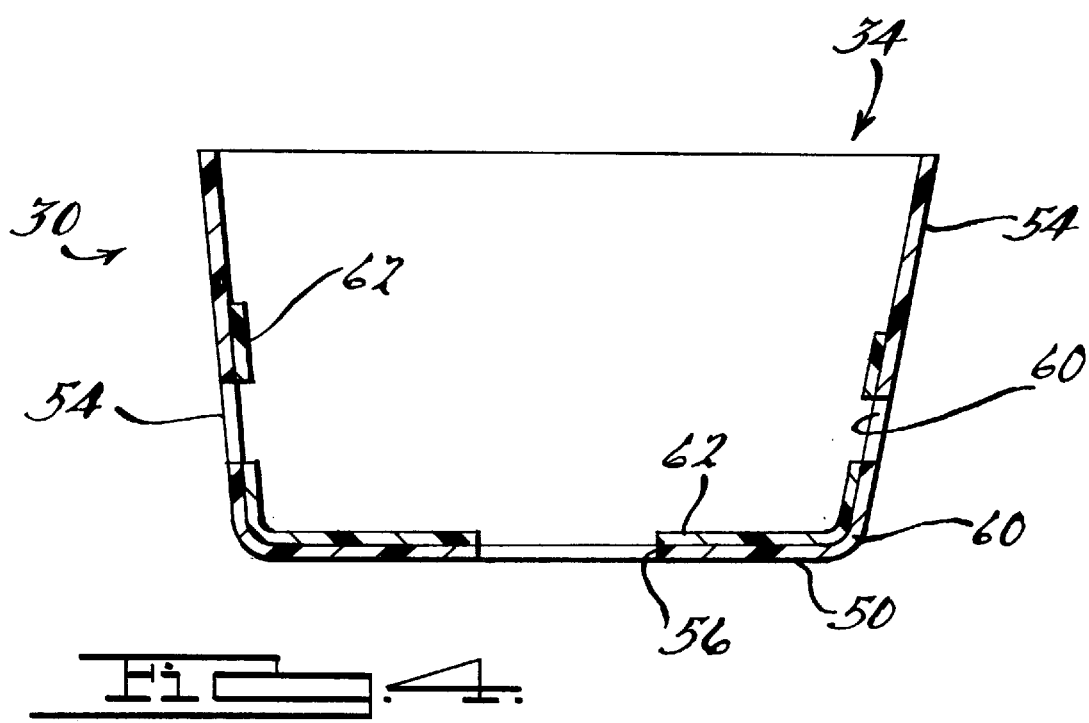
FIG. 4 is a top view of one member of the shroud.

Referring generally to FIGS. 1 through 6 of the drawings, a steering arrangement for a motor vehicle constructed in accordance with the teachings of the preferred embodiment of the present invention is shown and identified with reference numeral 10. As illustrated, the steering arrangement 10 of the present invention includes a steering column 12 oriented to extend into the passenger compartment of a motor vehicle. The steering column 12 includes a tilt mechanism (not specifically shown) and further includes a splined end 14 which extends from an instrument panel 16 of the vehicle for engaging a steering wheel 18. The tilt mechanism is controlled by a manually actuated lever 20 extending from the instrument panel 16 and permits the steering wheel 18 to be adjusted between a raised position and a lowered position. FIGS. 1 through 3 illustrate the steering arrangement 10 when the steering wheel 18 is in its raised position. The steering arrangement 10 is illustrated with the steering wheel 18 in its lowered position in FIG. 5.

In a generally conventional manner, first and second manually operated handles 22 and 24 laterally extend from the steering column 12. The handles 22 and 24 are operable for controlling features of the vehicle 25 such as turn signals, wipers, and the like. An ignition lock 26 also laterally extends from one side of the steering column 12.

The steering arrangement 10 of the present invention is shown to further include a shroud 30 which surrounds the steering column 12 and is interdisposed between the instrument panel 16 and the steering wheel 18. In the preferred embodiment, the shroud 30 is of a two part construction including a first member 32 and a second member 34. Much of the remainder of this description will focus upon the interrelationship between the first and second members 32 and 34 of the shroud 30 as they cooperate to conceal the steering column 12 as the steering wheel 18 is pivoted between its raised position and lowered position.

As shown in the drawings, the first member 32, or upper member, of the shroud 30 is fixedly attached to the instrument panel 16 and the remainder of the steering arrangement 10 is permitted to pivot with respect thereto. In the preferred embodiment, the first member 32 is adhesively secured or otherwise suitably attached to the instrument panel 16.

The first member 32 is integrally formed of plastic or any other suitable material to include a front panel 36, a top 38 and a pair of laterally opposed sides 40. In the embodiment illustrated, the top 38 angles upwardly as it extends rearward. The laterally opposed sides 40 are formed similarly to include a generally rectangular cutaway portion 42 for operatively receiving one of the control handles 22 and 24 as it laterally extends from the steering column 12. A rear boundary 44 of the first member 32 is contoured to follow the mating contour of the vehicle instrument panel 16. An aperture 46 is provided in the top 38 of the first member 32 which receives a control element 48 for the vehicle hazard lights.

The second member 34, or lower member, of the shroud 30, is also formed from plastic or other suitable material and similarly includes a front panel 50, a bottom 52 and a pair of laterally opposed sides 54. The second member 34 of the shroud 30 is fexedly attached to the steering column 12 such that pivotal movement of the steering column 13 causes the second member 34 to move in a correspondingly equal manner. The second member 34 is secured or otherwise coupled to the steering column 12 through a seitable conventional securing means. The front panels 36 and 50 of the first and second members 32 and 34 of the shroud 30 are configured to cooperatively define an aperture 56 through which the splined end 14 of the steering column 12 extends for engagement with the steering wheel 18. A flat rear surface (not specifically shown) of the steering wheel 18 is positioned adjacent the front panels 36 and 50 of the first and second members 32 and 34.

The lower member 34 of the shroud 30 is formed to further include a inwardly extending flange 60 located about an upper edge of the opposing sides 54 and the front panel 50. A dependent wall 62 upwardly extends from the flange 60. The dependent wall 62 is interrupted to cooperatively receive the first and second control handles 22 and 24 and the splined end 14 of the steering column 12 which extends into the passenger compartment. In this regard, the wall 62 is effectively cutaway immediately adjacent the aperture 56 and cutaway portion 42 of the first member 32 thereby resulting in a plurality of wall segments.

When the steering wheel 18 is articulated to its raised position, the first member 32 substantially overlaps the upwardly depending wall 62 of the second member 34. When the steering wheel 18 is articulated from its raised position toward its lowered position, the upwardly depending wall 62 is exposed, but the steering column 12 remains substantially concealed behind the shroud 30.

While the above detailed description describes the preferred embodiment of the present invention, it will be understood that the present invention is susceptible to modification, variation and alteration without deviating from the scope and fair meaning of the subjoined claims.

What is claimed is:

1. Shroud for a motor vehicle steering arrangement having an instrument panel and a steering column with a tilt mechanism interconnected to a steering wheel, the shroud comprising:

a first member including a front panel portion, the first member adapted to be coupled to the instrument panel; and a second member including a front panel portion and a dependent wall portion, the second member adapted to be coupled to the steering column for pivotal movement therewith as the steering wheel is moved between a raised and a lowered position;

the dependent wall portion being offset from the front portion of the second member and substantially parallel to the front portion of the first member such that the first and second members are at least partially overlapped when the steering wheel is in the raised position.

2. The shroud for a motor vehicle steering arrangement of claim 1, wherein said first and second members each include a pair of laterally opposing sides.

3. The shroud for a motor vehicle steering arrangement of claim 2, wherein said front panel portions of said first and second members cooperatively define an aperture through which an end of the steering column is permitted to pass.

4. A steering arrangement for a motor vehicle having an instrument panel, the steering arrangement including:

a steering wheel;

a steering column including a first end adapted to extend into a passenger compartment of the motor vehicle, the steering column further including a tilt mechanism pivotally interconnecting the steering column and the steering wheel such that the steering wheel is vertically adjustable between a raised position and a lowered position; and a shroud including a first member and a second member, the first member including a front panel portion, the first member adapted for being coupled to the instrument panel of the vehicle, the second member including a front panel portion and a dependent wall portion, the second member being coupled with the steering wheel for movement therewith;

the dependent wall portion being offset from the front portion of the second member and substantially parallel to the front portion of the first member such that the first and second members are at least partially overlapped when the steering wheel is in the raised position.

5. The steering arrangement for a motor vehicle of claim 4, wherein said first and second members each include a pair of laterally opposing sides.

6. The steering arrangement for a motor vehicle of claim 5, wherein said front panel portions of said first and second members cooperatively define an aperture through which an end of the steering column is permitted to pass.

* * * * *